United States Patent [19]
Zellers

[11] 4,386,260
[45] May 31, 1983

[54] SUPPORTING ELEMENT FOR RADIANT HEATING MODULE

[76] Inventor: Mabel W. Zellers, P.O. Box 183, Reading, Pa. 19603

[21] Appl. No.: 208,377

[22] Filed: Nov. 19, 1980

[51] Int. Cl.³ .............................................. H05B 3/20
[52] U.S. Cl. ................................... 219/345; 219/355; 219/357
[58] Field of Search .............................. 219/339–358, 219/405, 411; 362/222, 223, 376; 49/50, 57; 73/325, 326

[56] References Cited

U.S. PATENT DOCUMENTS

| | | | |
|---|---|---|---|
| 1,109,551 | 9/1914 | Shoenberg | 219/350 |
| 1,514,287 | 11/1924 | Hynes | 219/350 |
| 2,291,488 | 7/1942 | Naysmith | 362/222 |
| 2,291,493 | 7/1942 | Naysmith | 362/222 |
| 3,062,945 | 11/1962 | Glynn | 219/347 |
| 3,085,143 | 4/1963 | Antoncich | 219/347 |
| 3,172,608 | 3/1965 | Ausman | 362/376 |
| 3,525,850 | 8/1970 | Hager, Jr. | 219/357 |
| 3,582,614 | 6/1971 | Zellers | 219/345 |

FOREIGN PATENT DOCUMENTS 1589395 9/1970 Fed. Rep. of Germany ...... 362/223

*Primary Examiner*—Bernard Roskoski
*Attorney, Agent, or Firm*—Neil F. Markva

[57] ABSTRACT

A rigid, glass panel, infra-red heating element is operatively disposed between the side portions and adjacent the back portion of an elongated open-sided housing. The side portions of the housing extend along the opposed edges of the back portion. An elongated supporting element extends between the side portions and across the side of the glass panel heating element opposite the back portion. The supporting element has sufficient strength to hold the glass panel within the housing in the event that the glass of the panel shatters, thereby becoming flexible and in a sagging condition.

5 Claims, 7 Drawing Figures

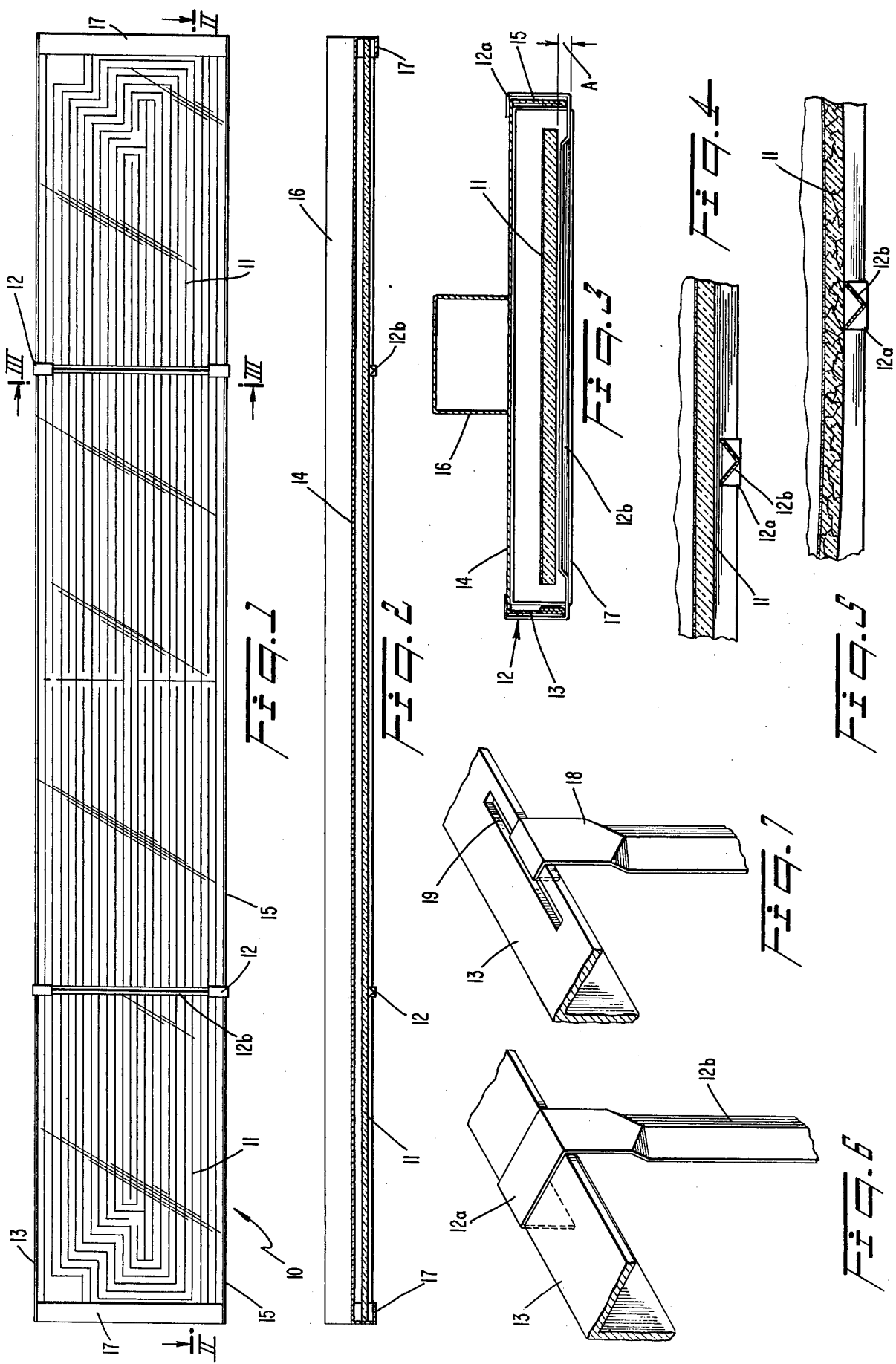

SUPPORTING ELEMENT FOR RADIANT HEATING MODULE

FIELD OF THE INVENTION

This invention relates to a radiant heating module having a laminated radiant heating panel.

BACKGROUND OF THE INVENTION

Radiant heating panels used in combination with a housing to form a radiant heating module are well known as exemplified by the U.S. Pat. Nos. 3,060,300 and 3,582,614. The heating panel is composed of a glass sheet that is laminated by adhesively securing a fabric material across one side of the glass sheet. The fabric material comprises a layer of heat resisting material which constitutes a backing or upper surface of the glass panel so that if the glass plate or sheet breaks, the broken fragments of the glass will be fixedly secured to the heat resisting material.

The U.S. Pat. No. 3,062,945 discloses a particular type of heater which clamps such a glass heater plate into position within a reflector or housing unit to form a radiant heating module. This type of glass panel is so designed that in the event of a large electrical surge such as might occur in the electric power plant or may be caused by a lightening bolt, the glass itself simply breaks into very small sized cubed pieces. When such a breaking occurs, the panel becomes flexible and develops a sagging condition. Such a condition is particularly dangerous in the event that the heating module is disposed at an elevated position such as at the cove or in the ceiling of a room.

This particular type of heating panel does not become hot enough to cause burning if it were touched by anyone. At the same time, because the type of heating is by infra-red rays, it is important that a minimal amount of obstruction be placed in front of the infra-red glass heating panel. Thus the type of grillwork generally known in the prior art and as disclosed in U.S. Pat. No. 2,717,950 is not necessarily required to prevent someone from touching the infra-red heating panel. Furthermore, it is undesirable to have the guard or grid assembly projecting outwardly from the outer edge of the opposing sides of the housing in which the glass heating panel is contained. Such a projecting guard or grid mechanism may actually present a heated hazard when used in conjunction with the typical prior art electrical resistance space heater.

SUMMARY OF THE INVENTION

The invention as described herein provides a radiant heating module, particularly adapted for overhead disposition and including an elongated supporting element extending between the side portions of the housing and on the outer facing side of the glass heating panel. The supporting element has sufficient strength to hold the glass panel within the housing in the event that the glass panel becomes flexible due to the shattering of the glass into small glass beads which adhere to the heat insulating backing material and become disposed in a sagging condition. The supporting element does not come in contact with the glass heating panel during normal use of the radiant heating module. At the same time, the supporting element does not project outwardly from the upstanding side portions which could project outwardly from the back portion of the housing in which the glass panel is disposed. Thus, the supporting element is spaced outwardly from the rigid glass panel under normal operating circumstances.

Another feature of the invention is that the supporting element has a connecting section attached to the side portions of the housing and a bearing section adjacent the glass panel radiating surface. In a specific embodiment, the bearing section of the supporting element includes an angled cross section. There are a plurality of supporting elements laterally spaced with respect to each other along the length of the housing and the glass panel. These supporting elements are separate and independently acting with respect to each other. Each supporting element is resiliently fixed to the side portions of the housing at the connecting sections thereof.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 1 is a front elevational view of a radiant heating module made in accordance with this invention;

FIG. 2 is a sectional view along line II—II of FIG. 1;

FIG. 3 is a sectional view along line III—III of FIG. 1;

FIGS. 4 and 5 are fragmentary sectional views showing the disposition of the supporting element with respect to the radiating surface of the glass heating panel;

FIG. 6 is a fragmentary perspective view showing the connecting section of one embodiment of a supporting element made in accordance with the invention as shown in FIG. 1; and FIG. 7 is a perspective view of another embodiment of a supporting element made in accordance with this invention.

DETAILED DESCRIPTION

The radiant heating module, generally designated 10, includes an elongated open-sided housing having a back portion 14 and two upstanding side portions 13 and 15 extending along opposed edges of back portion 14. An elongated channel 16 is disposed on the outside of back portion 14 to contain the electrical conduit. A rigid, glass panel 11 is mounted in the housing in a known manner such as is disclosed in my earlier U.S. Pat. No. 3,582,614 which disclosure is hereby incorporated by reference. The various electrical connections have not been shown for the sake of clarification. Glass panel 11 is mounted in the housing through the use of the end sections 17 in a manner well known in the prior art.

The radiant heating module 10 of this invention is used either as a cove unit or as a ceiling unit. Wire guards such as are commonly used in the prior art on wall and baseboard units to keep people from damaging the glass panel are not used with cove and ceiling units. However, the danger exists of the laminated glass panel 11 becoming flexible and sagging in a limp fashion so that there is a danger of the panel falling outwardly from the open sided housing. It has been found that the use of a relatively small supporting element 12 extending between the side portions 13 and 15 adjacent and on the side of glass panel 11 opposite the back portion 14 will solve the potential problem. In this embodiment, the upstanding side portions are about 11/16" deep and project outwardly above the outer radiating surface of glass panel 11 by the distance A as shown on FIG. 3. In this embodiment, the distance A is about ⅛". The elongated supporting element 12 includes a connecting section 12a attached to side portions 13 and 15 and a bearing section 12b disposed adjacent the radiating surface of glass panel 11 as shown.

The bearing section 12b has an angled cross section which provides additional strengthening to the strap sheet metal element 12. The bearing section 12b is spaced outwardly from the radiating surface of the rigid glass panel 11 so that no heat loss is effected through conduction. At the same time, supporting element 12 has sufficient strength to hold the glass panel 11 within the housing in the event that panel 11 becomes flexible and becomes limp and sagging such as is shown in FIG. 5.

In this particular embodiment, supporting element 12 is made of a strap of sheet metal which is about ⅜" wide and 1/32" thick. In this embodiment, the sheet metal is steel. There are a plurality of supporting elements 12 laterally spaced with respect to each other along the length of the housing and glass panel 11 as shown in FIGS. 1 and 2. Supporting element 12 is resiliently fixed to the side portions 13 and 15 of the housing as shown, particularly in FIG. 6. A further embodiment of the manner in which a connecting section 18 may be attached to a slot 19 located in the side portions 13 and 15 is shown in FIG. 7. In this embodiment, glass panel 11 is ¼" thick, 6" wide and 45" long. It is necessary that the supporting elements be disposed in such a fashion so that if the panel 11 were to become flexible and experience a sagging condition along its longitudinal length that the supporting elements 12 would be so disposed as to maintain the panel 11 within the housing until such time that the appropriate repairs could be made. In this embodiment, a supporting element is placed approximately ¼ of the length in from each end of the radiant heating module 10.

While the Supporting Element for Radiant Heating Module has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. The combination comprising:
   (a) an elongated open-sided housing including a back portion and two side portions extending along the opposed edges of the back portion,
   (b) means mounting a rigid, glass, infrared heating panel in said housing, said glass panel having an outwardly facing radiating surface and being operatively disposed between the side portions and adjacent the back portion of the housing,
   (c) an elongated supporting element having connecting sections attached to the side portions and an elongated bearing section extending between the side portions, said elongated bearing section being laterally spaced outwardly from the radiating surface so that the supporting element does not touch the panel during operative normal use of the heating glass panel,
   (d) said supporting element having sufficient strength for the bearing section to hold said glass panel within said housing with the connecting sections attached when said glass panel is in an inoperative, flexible, sagging condition.

2. The combination as defined in claim 1 wherein the bearing section of the supporting element includes an angled cross-section.

3. The combination as defined in claim 1 wherein there are a plurality of supporting elements laterally spaced with respect to each other along the length of the housing and glass panel.

4. The combination as defined in claim 1 wherein the connecting sections of the supporting element are resiliently fixed to the side portions of the housing.

5. The combination as defined in claim 1 wherein the side portions include a slot, and the connecting sections of the supporting element are resiliently fixed to the side portions within said slots.

* * * * *